April 14, 1953 R. B. DOME 2,635,140

FREQUENCY-INTERLACE TELEVISION SYSTEM

Filed July 28, 1950 6 Sheets-Sheet 1

Inventor:
Robert B. Dome,
by Merton D. Moore
His Attorney.

Inventor:
Robert B. Dome,
by Merton D. Morse
His Attorney.

Inventor:
Robert B. Dome,
by Merton D. Morse
His Attorney.

Inventor:
Robert B. Dome,
by Merton D. Moore
His Attorney.

Inventor:
Robert B. Dome,
by Merton D. Moore
His Attorney.

April 14, 1953 R. B. DOME 2,635,140

FREQUENCY-INTERLACE TELEVISION SYSTEM

Filed July 28, 1950 6 Sheets-Sheet 6

Inventor:
Robert B. Dome,
by Merton D. Morse
His Attorney.

Patented Apr. 14, 1953 2,635,140

UNITED STATES PATENT OFFICE 2,635,140

FREQUENCY-INTERLACE TELEVISION SYSTEM

Robert B. Dome, Geddes Township, Onondaga County, N. Y., assignor to General Electric Company, a corporation of New York Application July 28, 1950, Serial No. 176,405

26 Claims. (Cl. 178—5.2)

My invention relates to a method and apparatus for simultaneously multiplexing two complex signal waves in a single signal channel. It has particular application and utility in a color television system for transmitting and reproducing two or more image signals representative of different color components of a transmitted scene, although in its broader aspects it is applicable to the multiplexing of other complex signals having characteristics similar to those of a television picture signal.

According to current television broadcasting standards in the United States for monochrome picture transmission, the televised scene is sequentially scanned from left to right and from top to bottom in a series of narrow horizontal lines, in a manner analogous to the way the eye of a reader scans a page of printed material. Each complete scan of the scene to be transmitted, or picture frame, requires the scanning spot to traverse 525 horizontal scanning lines across the scene within $\frac{1}{30}$ of a second. To reduce flicker, double interlace is employed, that is, 262½ "odd lines" are first scanned within $\frac{1}{60}$ of a second, constituting one picture field, and the remaining 262½ "even lines" are scanned during the next picture field to complete the frame. Thus the horizontal scanning rate is 15,750 lines per second and the vertical scanning rate is 60 fields per second. As is well known to those skilled in the art, various blanking and synchronizing pulses are also inserted at these same rates at the ends of the scanning lines and picture fields.

The composite television picture signal, as above described, is modulated upon a picture carrier wave, and any accompanying sound signals are modulated upon a second carrier wave spaced 4.5 megacycles above the picture carrier. The two carriers and their sideband components are required to be transmitted within a channel having a total bandwidth of 6 megacycles, approximately 4.75 megacycles being devoted to the transmission of the picture signal components. By employing unsymmetrical or vestigial transmission of the picture signal sidebands, a total range of picture signal components up to about 4 megacycles can be transmitted. This range of frequencies has been found to be adequate for acceptable resolution of the picture detail in the reproduced image.

As of this date, the transmission of television images in colors is still in the development stage and no definite standards of transmission have yet been established in the United States comparable to those for monochrome transmission. However, due to the tremendous investments which have been made in television transmitters and television broadcast receivers for monochrome operation, it is highly desirable, if not almost essential, that any standards adopted for color television be such as to render as little existing equipment obsolete as possible. To this end, color television transmission should ideally be capable of accomplishment within essentially the same standards as those already established for monochrome transmission, or at least be compatible with present standards. That is, the standards for color transmission should be such as to permit a conventional monochrome receiver to reproduce a satisfactory black-and-white image in response to receipt of a color signal. This immediately creates some technical difficulties, because it is generally agreed that picture signals representative of at least three different color components must be transmitted for production of high quality color pictures. These are commonly designated as the green, red and blue picture signals, and they will so be designated for convenience in the following specification, although those skilled in the art of colorimetry will understand that the three additive primary color components are actually required to be a green, a red-orange and a blue-violet.

Thus far, the systems which have been developed for color television may be broadly placed in two classes: (1) those in which the signals representative of the different color components are transmitted in a predetermined sequence by time division multiplex techniques, and (2) those in which the signals representative of the different color components are transmitted simultaneously over different frequency channels.

The first class includes systems of the so-called "field sequential" type in which interlaced picture fields are sequentially transmitted in the different colors, of the "line sequential" type in which interlaced scanning lines are sequentially transmitted in the different colors, and of the "dot sequential" type in which small, individual picture elements are sampled in the different colors in a predetermined sequence and sequentially transmitted.

In all such color television systems, the common problem is presented of transmitting as much picture detail as possible for each of the components, within a transmission channel of predetermined bandwidth. With the various sequential systems heretofore proposed, it is possible to transmit an adequate range of picture frequency components within the band of approximately 4.75 megacycles now allotted for monochrome transmission, but necessarily the effective field repetition rate is necessarily reduced, giving rise to flicker, color smearing, and other undesirable effects, to a greater or less degree.

The simultaneous type of transmission permits all three color components to be transmitted at the same repetition rate, but inherently requires a much greater bandwidth for the acceptable reproduction of picture detail. In simultaneous color television systems developed some years ago, bandwidths of from 12 to 16 megacycles were employed, but in recent years a considerable reduction has been achieved, without objectionable loss of picture detail, through the use of the "mixed highs" principle. This will not be described herein in complete detail, since it is well known to those skilled in the art and described in the literature. See for example the textbook entitled "Radio Engineering" by F. E. Terman, pages 854–856 (McGraw-Hill, Third Ed., 1947), and U. S. application Serial No. 714,750, filed December 7, 1946, by Alda V. Bedford for "Simultaneous Multi-Color Television," now Patent No. 2,554,693, granted May 29, 1951.

Very briefly, the "mixed highs" system is based upon the premise that it is not necessary to transmit a full frequency range of components for each of the three component colors in order to obtain an image which is satisfactory to the eye. The green signal is transmitted with a substantially full range of components extending up to approximately 4 megacycles and it has mixed with it the higher frequency components of the red and blue signals. The higher frequency components of all three signals comprise the "mixed highs." Only the lower frequency components of the red and blue signals are then transmitted on separate bands, which need not be as wide as that required for the green signal. At the receiver, equal portions of the mixed highs from the green signal are impressed on each one of the three cathode ray systems employed to reproduce the color images. Only the lower frequency components are impressed on the respective systems individually. The net result is that the lower frequencies in the three color signals are reproduced in their respective colors in the composite color image, while the mixed highs are simultaneously reproduced in all three colors so as to cause the fine detail of the image to appear in shades of gray. The technique is similar to that employed in color printing, in which the fine detail of the image is carried by the so-called "black printer," only the broader details being printed in colors. However, the effect upon the eye of the observer is not substantially different from that obtained when all three complete bands of color components are transmitted and reproduced separately, thus allowing a substantial reduction in bandwidth for the same apparent picture detail.

In practice, a reduction in bandwidth to about 8–9 megacycles has heretofore been achieved in simultaneous systems employing mixed highs. However, this is still much greater than the bandwidth currently allotted to the picture signal components for monochrome transmission, by a factor of roughly two to one. Nevertheless, it has the advantage that it is compatible, in that an ordinary black-and-white receiver, tuned to the green signal, will produce an image not differing greatly from that resulting from ordinary monochrome transmission.

More recently, the mixed highs principle has been applied to reduce the required bandwidth in the dot sequential type of system, so that color pictures of acceptable quality have been experimentally reproduced with transmission within the standard 6-megacycle channel. However, the sequential type of system is still much more complex than the simultaneous system in its requirements for extreme precision in sampling and synchronizing the color components.

In accordance with my invention, I preferably make use of the mixed highs technique in order to reduce the required bandwidths to some extent, and I additionally employ an entirely different technique from any heretofore proposed, in order to transmit the several picture signal components simultaneously through a single frequency channel. Furthermore, this channel need be no wider than that currently allocated for monochrome transmission in order to provide high fidelity color reproduction. I achieve this simultaneous transmission of signals, without interference, through what may be termed frequency-interlace. In accomplishing this, I make use of the peculiar frequency characteristics of a television picture signal (or similar type of complex signal whose frequency components are analogous to those resulting from a scanning operation). This will be discussed in greater detail at a subsequent point in this specification, but very briefly I make use of the fact that the frequency spectrum of a television picture signal is not continuous. Instead, the principal frequency components containing the picture information are concentrated at or near a plurality of discrete frequencies which are harmonics of the scanning frequencies. The useful energy in the video signal may be regarded as lying in relatively narrow bands, throughout the relatively wide band of 4 megacycles or more which is required for a satisfactory transmission of picture detail, with relatively wide interspersed bands which carry little or no useful video information. In accordance with my invention, I so space the corresponding sideband components of the several transmitted picture signals so that the narrow bands containing the useful picture information of one or more of the signals lie within the unused portions of the frequency spectrum between the sidebands of another of the signals. Thus, the several independent signals may be transmitted in such a manner as to make much more efficient use of the available frequency bands and without the principal modulation components of one signal interfering with those of another signal. As will be pointed out more fully hereinafter, I also make use of the phenomenon of persistence of vision in the eye of the observer to assist in resolving the various frequency components in the reproduced composite picture image.

It is thus broadly an object of my invention to provide a method and system for the simultaneous translation of two independent complex signals each having component frequencies extending over the same frequency spectrum but having these component frequencies bunched or concentrated at or near a plurality of frequencies which are integral multiples of a common frequency. Thus, while my invention has immediate and obvious utility in its application to color television, in its broader aspects it may readily have other applications for the simultaneous multiplexing of other types of independent signals having comparable frequency characteristics. For example, these general principles are applicable to other types of facsimile transmission systems, stereoscopic television, and the like.

More specifically, it is an object of my invention to provide a method and system for the simultaneous transmission of two independent television signals over a single signal channel having a bandwidth no greater than that required for the transmission of the frequency components of one of the signals. In this case, the common frequency, which determines the spacing between the narrow bands of useful signal components, is a scanning frequency or harmonic thereof.

Still another object of my invention is to provide an improved multiplex television system and method in which two simultaneous television picture signals are interlaced in frequency for transmission but readily resolvable, as viewed by an observer at a receiver, without the use of special electrical synchronizing circuits or complex frequency selective circuits.

Another object of my invention is to provide a new and improved color television system and method in which signals representative of two or more different color components of a scanned scene may be simultaneously transmitted over a single signal channel of bandwidth no greater than that normally required for monochrome transmission and which may nevertheless be utilized to recreate a composite color image of high resolution and color fidelity.

Yet another object of my invention is to provide an improved simultaneous color television system and method which provides high fidelity of color reproduction and a high degree of resolution of picture detail, and which is entirely compatible with presently-accepted standards for monochrome transmission.

Another object of my invention is to provide an improved simultaneous color television system and method by which the transmission and reproduction of high fidelity television or facsimile images in natural colors, together with any desired accompanying audio information, may be achieved within the present-day 6-megacycle television channel.

For additional objects and advantages, and for a better understanding of my invention, attention is now directed to the following detailed description and accompanying drawings. The features of my invention believed to be novel are also particularly pointed out in the appended claims.

Figures 1, 3:
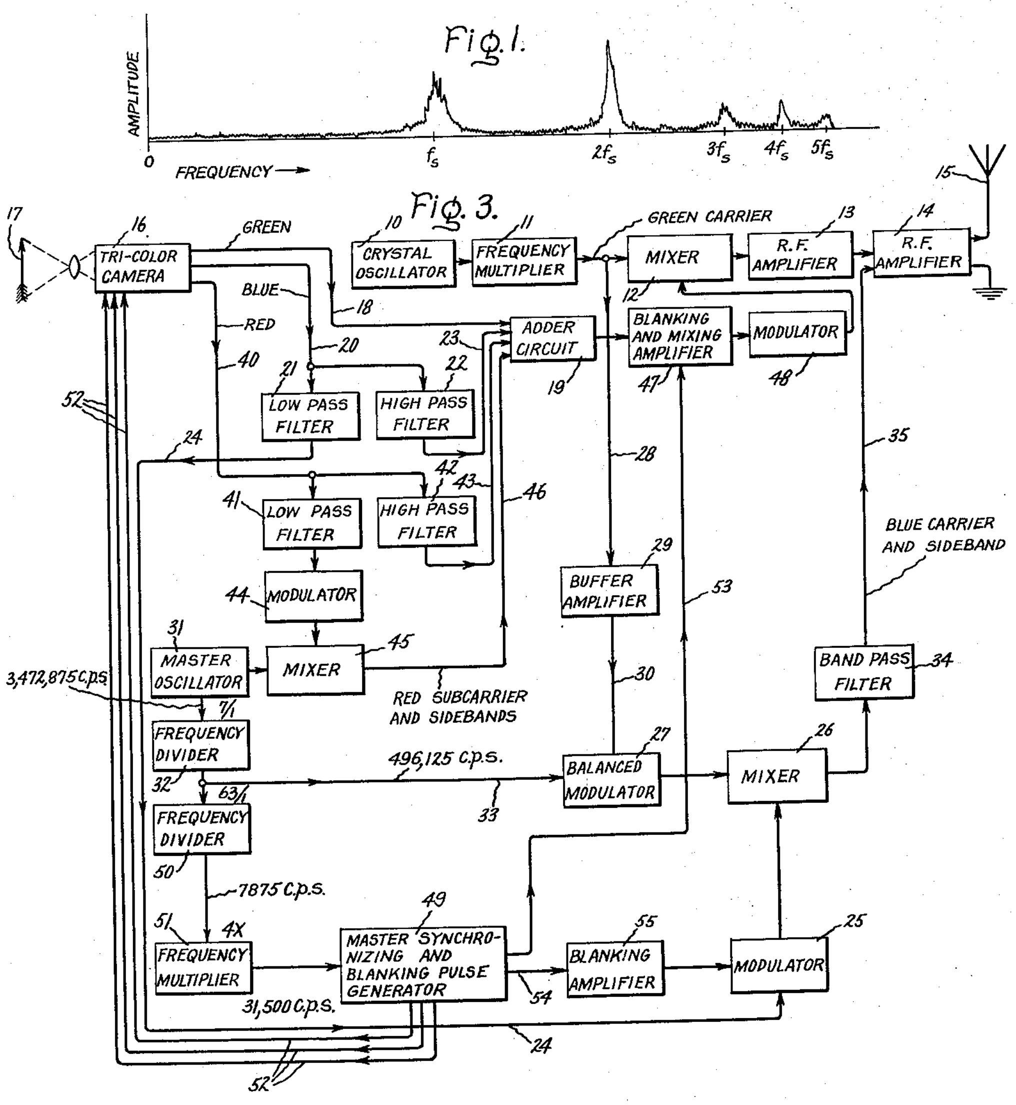
Fig. 1 is a representation of the frequency spectrum of a television picture signal, based on a test oscillogram.
Fig. 3 is a one-line, block diagram of a complete color television transmitter embodying my invention, for radiating signals having the characteristics illustrated in Fig. 2.

In the several figures of the drawings, corresponding elements have been indicated by corresponding reference numerals, to facilitate comparison, and those circuit elements which may in themselves be entirely conventional and whose details form no part of the present invention are indicated in simplified block form with appropriate legends.

The previously-mentioned peculiar characteristics of a television picture signal, involving the concentration of the useful energy in relatively narrow bands which are harmonics of the line and field scanning frequencies, have been recognized for over 15 years. The phenomenon is extensively reported and analyzed in the article by Pierre Mertz and Frank Gray, appearing in "The Bell System Technical Journal," July 1934, at pages 464–515. For convenient reference, there is reproduced in Fig. 1 a representation of an oscillogram taken from Fig. 1 of that article. This shows the amplitude-frequency characteristics of a television scanning signal resulting from scanning the "human face with rapid motions of head and hands." The wave form is plotted to a logarithmic scale, with the frequency of horizontal, or line, scanning indicated as $f_s$. It will be observed that the energy of the scanning signal is almost entirely concentrated at or near this frequency and at the harmonics $2f_s$, $3f_s$, etc., even though the scene being scanned includes moving objects. This can be shown to be true of any comparable picture scanning signal. The authors of the article also investigated the relatively low-amplitude frequency components in the intervening portions of the frequency spectrum and found that they could be completely eliminated with practically no effect upon the quality of a picture reproduced from the signal. In fact, they found that these weak signal components contained about an equal proportion of useful signal information and of undesired extraneous components. While the authors of the article also very generally recognized that it might be possible to place other communication channels within the waste regions of the frequency spectrum, they concluded that the improvement likely to be secured would not justify the technical problems created in transmission and reception. However, I have discovered a simple manner in which this may be accomplished and in which the components may again be separated out in the reproduced picture image, as viewed by the eye.

Figure 2:
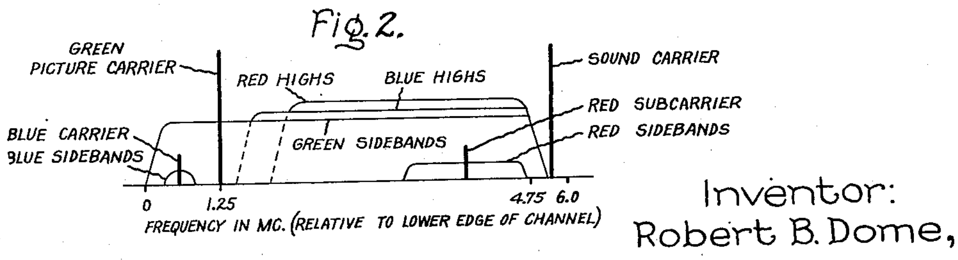
Fig. 2 is a simplified representation of the frequency spectrum occupied by three color television picture signals and an accompanying sound signal, transmitted in accordance with the principles of my invention.

Fig. 2 schematically represents the radiated carrier waves and their modulated components within a complete 6-megacycle television broadcasting channel, as produced in accordance with my invention. The spectrum for the green picture carrier, the green side bands, and the sound carrier may be substantially in accordance with the present standards of transmission for monochrome signals in the United States, for example as shown on page 843 of the previously-mentioned text book on "Radio Engineering" by Terman. This is standard vestigial sideband transmission, and the green picture signal may be generated in substantially the same manner as that now commonly used for black-and-white picture signals; that is, the entire upper sideband of about 4 megacycles width is transmitted, but the higher modulation frequencies in the lower sideband are suppressed so that a range of only about 1.25 megacycles is transmitted.

In accordance with the "mixed-highs" principle previously discussed, the higher-frequency modulation components of the red and blue signals are mixed with the green signals and transmitted simultaneously, only the lower-frequency components being transmitted separately. Although the exact frequencies are not critical, it has been found that only those frequency components of the red and blue signals below about 1 megacycle in frequency are needed for good color rendition. In fact, the frequency range of the transmitted blue components can be as low as .2 megacycle or even lower. For convenience of reference, the higher frequency components of the red and blue signals which are mixed with the green signal will hereafter be called the "red highs" and the "blue highs," and the mixed high frequency components of all three signals will be called the "mixed highs." The lower frequency components of the red and blue signals will hereafter be identified, for convenience of reference, as the "red lows" and the "blue lows."

In the form of my invention exemplified by Fig. 2, the red lows and the blue lows are respectively modulated upon two carriers. The frequency of each carrier is such that it lies within the same frequency band as the green sidebands and is spaced from the green carrier by some odd multiple of one-half the line scanning frequency. Preferably, as indicated in Fig. 2, the red carrier is produced by modulating the green carrier with a red subcarrier having a frequency equal to the desired frequency spacing. The red and blue carriers and their sidebands, which are mixed in with the green signals, are located in non-overlapping relation to each other. By way of illustration, the red subcarrier and its sidebands are shown in Fig. 2 as being located near the upper end of the upper green sideband, while the blue carrier and its sidebands are located within the lower vestigial sideband of the green picture carrier. In either case, the various modulation components of the red and blue carriers lie halfway between the adjacent modulation components of the green signal, by virtue of their particular frequency relationship to the line scanning frequency.

Reference is now made to the block diagram of a complete color television transmitter, as shown in Fig. 3, for radiating the television picture signal components of Fig. 2. The main, or green, carrier wave is derived in conventional manner from a crystal oscillator 10 and frequency multiplier 11. It is modulated by various signal components in the mixer 12 and then conventionally amplified in radio frequency power amplifiers 13 and 14 before being impressed upon a suitable signal transmission channel, represented by the antenna 15. Certain additional radio frequency components are also added to the signal in the amplifier 14, as will be presently described.

The three color picture signals are generated in the tri-color camera 16 which may be of any known type adapted to scan a colored scene 17 and to deliver three synchronized scanning outputs respectively representative of the green, blue and red color components of the scene. The camera 16, may, for example, comprise three separate camera pickup tubes, each provided with an appropriate color filter and arranged to synchronously scan the scene 17 in proper optical registry. A tricolor camera of the flying-spot type might also be used, such as that described in the article appearing in the "Proceedings of the I. R. E.," September 1947, pages 862–870.

The complete green picture signal is supplied over conductor 18 to an adder circuit 19 which may consist of four amplifier tubes whose anodes are connected together across a common output load impedance but whose individual control grids receive independent signals, one of which is the green signal.

The blue picture signal is delivered over conductor 20 to a pair of filters 21 and 22. These are respectively low pass and high pass filters having substantially the same cut-off frequency. For example, low pass filter 21 may have its cut-off in the frequency region near .2 mc., and high pass filter 22 may have its cut-off at substantially the same frequency. Thus the two filters 21 and 22 have substantially complementary frequency characteristics for passing the blue lows and the blue highs respectively. The output of the high pass filter 22 is supplied over conductor 23 to a second tube in the adder circuit 19.

The output of the low pass filter 21 is supplied over conductor 24 to a conventional amplitude modulator 25, whose output in turn modulates a radio frequency wave of the blue carrier frequency in a mixer 26. The blue carrier is preferably derived from a balanced modulator 27 which is in turn fed from two sources of radio frequency signals. One source is the main, or green, carrier wave supplied over conductor 28 to a buffer amplifier 29, and thence over conductor 30 to balanced modulator 27. The other wave is derived from a master oscillator 31 through a frequency divider 32 whose output is also supplied to an input of the balanced modulator 27 over conductor 33. It will be readily apparent to those skilled in the art that the signals supplied from the output of the balanced modulator 27 include a frequency which differs from the frequency of the green carrier by the frequency supplied from frequency divider 32. This is used as the blue carrier which, after modulation in the mixer 26, is supplied through a band pass filter 34 and conductor 35 to the radio frequency amplifier 14. The band pass filter 34 has sharp frequency cut-off characteristics which eliminate the green carrier frequency and the upper side bands resulting from the heterodyne conversion in balanced modulator 27. The resultant signal supplied over conductor 35 is therefore the blue carrier and its sidebands, lying on the lower side of the green picture carrier, as shown in Fig. 2. This signal is added to the other signals supplied to radio frequency amplifier 14 (not modulated on these signals) in a circuit which may be similar to that employed in adder 19.

In accordance with my invention, the frequency of the blue carrier is selected to differ from the green carrier frequency by a frequency which is not an integral multiple of the line scanning frequency. Preferably, it has a frequency difference equal to an odd multiple of one-half the line scanning frequency, so that the relatively narrow bands of frequencies in the blue sideband signals are interlaced with the adjacent narrow bands of frequencies in the green side band signals, as previously explained. Assuming that the transmitter of Fig. 3 is to operate with standard 525-line, 30-frame, double-interlaced transmission, in accordance with present U. S. monochrome standards, one-half the line scanning frequency is 7875 C. P. S. The master oscillator 31 may be adjusted, for example, to operate at a frequency of 3,472,875 C. P. S., which is the 441st multiple of 7875 C. P. S. The frequency divider 32 may, for example, have a division ratio of 7 to 1, in which case the blue carrier frequency will be spaced from the green carrier frequency by 496,125 C. P. S., which is the 63rd multiple of 7875 C. P. S.

The red picture signal is supplied over conductor 40 in Fig. 3 to a pair of low pass and high pass filters 41 and 42 which have complementary characteristics similar to those of the blue signal filters 21 and 22. For example, the cut-off frequency for these two filters may be in the vicinity of one mc. The output of the high pass filter 42 is supplied over conductor 43 to the control grid of a third tube in the adder circuit 19, while the output of low pass filter 41 is supplied to a modulator 44. Modulator 44 amplitude-modulates the red subcarrier signal which is supplied directly from master oscillator 31 to the mixer 45. The red lows are thereby modulated upon a subcarrier of the frequency of master oscillator 31, equal to 3,472,875 C. P. S. in this particular illustrative example. The red subcarrier and sidebands are then supplied over conductor 46 to the control grid of the fourth tube in the adder circuit 19.

It will thus be seen that the output of the adder circuit 19 includes the frequency components of the green picture signal together with the mixed highs of the red and blue picture signals and also the red subcarrier and its two sidebands. This composite signal is combined with the usual blanking pedestals and synchronizing pulses in a blanking and mixing amplifier 47, and supplied through modulator 48 to modulate the main green carrier in the mixer 12.

The usual pulse signals required for blanking and for synchronizing the camera sweep circuits may be generated in a conventional master synchronizing and blanking pulse generator 49, this generator being in turn synchronized from the master oscillator 31 through a suitable frequency divider and multiplier chain. As illustrated, the output of frequency divider 32 is again divided in the ratio of 63 to 1 in frequency divider 50, whose output is therefore 7875 C. P. S. This is in turn multiplied by a factor of four in frequency multiplier 51 in order to provide a synchronizing frequency of 31,500 C. P. S., which is that commonly employed in present practice, for reasons well understood by those skilled in the art.

Synchronizing and blanking pulses for the camera sweep circuits are represented schematically as being supplied over conductors 52 in Fig. 3. Blanking pedestals and synchronizing pulses are also supplied over conductor 53 to the main blanking and mixing amplifier 47. The modulator 25 for the blue carrier is also preferably blanked by means of blanking pulses supplied through conductor 54 and blanking amplifier 55. Detailed descriptions of the functions and operations of these synchronizing and blanking elements of the system are omitted in the interest of clarity, since they may be entirely conventional and are well understood by those skilled in the art.

Figure 4:
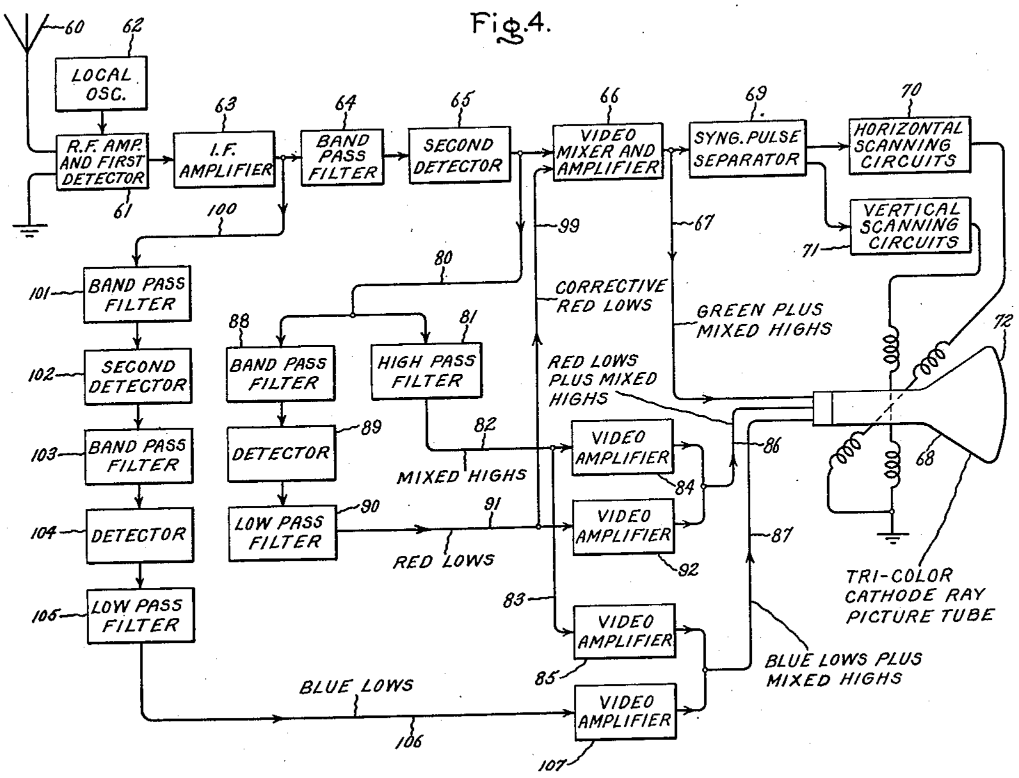
Fig. 4 is a one-line, block diagram of a color television receiver constructed, in accordance with my invention, to receive and reproduce the colored scene, in response to signals received from the transmitter of Fig. 3.

Fig. 4 is a simplified one-line block diagram of a color television receiver adapted to receive signals of the form represented in Fig. 3. The front end of this receiver may be that of a conventional superheterodyne television receiver, in which the signals received on antenna 60 are supplied to a radio frequency amplifier and first detector 61 in which they are heterodyned with signals from a local oscillator 62 in order to provide the usual intermediate frequency signals which are amplified in I. F. amplifier 63. The output of I. F. amplifier 63 is passed through a band pass filter 64, which greatly reduces the amplitudes of signals within the range of frequencies occupied by the blue carrier and its sidebands. The resultant video signal, which results from demodulation in the second detector 65, therefore does not contain an appreciable amount of the blue lows signal. The output of detector 65 is supplied through a video mixer and amplifier 66 and over a conductor 67 to that one of the three electron guns of a tricolor cathode ray picture tube 68 adapted to produce a green image on the viewing screen 72.

The picture tube 68 may be any suitable known type, for example the three-gun tube described in the magazine "Radio and Television News," June 1950, pages 46, 47 and 118 (and particularly shown in Fig. 1 of that article). Alternatively, it is of course possible to use three separate cathode ray tubes, each having a fluorescent screen adapted to produce an image in one of the desired colors, and to employ an optical system for superimposing the images for visual observation.

The synchronizing pulse components of the detected signal at the output of video amplifier 66 are separated out in conventional manner in the synchronizing pulse separator 69 and utilized to synchronize the horizontal and vertical scanning circuits 70 and 71 of the picture tube 68 in a well-known manner. Since the green signal also contains the mixed highs, it will be apparent that the green image produced on the screen of the picture tube 68 is representative not only of the green components of the composite picture signal but also of the red highs and the blue highs. In accordance with the known technique of receiving color picture signals with the mixed-highs principle, the output of second detector 65 is also supplied over conductor 80 to a pair of filters, one of which is a high pass filter 81 having a cut-off in the vicinity of the lower edge of the band including the red highs, for example about 1 mc. The output of filter 81 therefore also contains mixed highs from the green, red and blue signals. This is supplied over conductors 82 and 83 to video amplifiers 84 and 85. The output of video amplifier 84 is supplied over conductor 86 to the red electron gun of picture tube 68, while the output of video amplifier 85 is similarly supplied over a conductor 87 to the blue electron gun of picture tube 68. The proportions of mixed highs supplied to the three electron guns are preferably adjusted so that their resultant on the tricolor screen is a dark gray, thus lending apparent detail to the reproduced picture, for the reasons previously pointed out.

The composite video signal supplied over conductor 80 is also passed through a band-pass filter 88 which is designed to pass a range of frequencies including only the red subcarrier and its principal sidebands. These frequencies are detected in detector 89 and passed through an additional low pass filter having a cut-off frequency corresponding approximately to the upper edge of the red lows band. In the illustrative example this may be a frequency of the order of about 1 mc. The red lows are then supplied through conductor 91 and a video amplifier 92 to the conductor 86 which feeds the red gun of picture tube 68.

The blue carrier and its sidebands are selected and detected in another filter and detector chain. As shown in Fig. 4, this chain is energized over a conductor 100 which is supplied with the entire composite signal appearing at the output of I. F. amplifier 63. This signal is passed through a band pass filter 101 which is designed to pass not only the blue carrier and its sidebands but also the main, or green, picture carrier. The main carrier demodulates the blue carrier through heterodyne detection in a second detector 102, yielding a blue subcarrier and principal sidebands. If it is assumed that the receiver of Fig. 4 is receiving the signal from the transmitter of Fig. 3, this subcarrier has a frequency of 496,125 C. P. S. in the illustrative example. The output of detector 102 next passes through a band-pass filter 103 which selects the blue subcarrier and its principal sidebands. This wave is finally detected in an amplitude detector 104 to yield the low frequency blue signals. These are preferably again passed through a low pass filter 105 which has a frequency cut-off at the upper limit of the desired blue lows. For example, this may be about .2 mc. in the particular system illustrated. The blue lows are then supplied over conductor 106 to a video amplifier 107 whose output is supplied to the blue electron gun of picture tube 68 through conductor 87.

By virtue of the interlaced frequency relationships of the red and green signals, and of the blue and green signals, it will be apparent that each of the three picture signals impressed on the picture tube 68 will have in it some undesired frequency components of other color signals. Thus, the green signal will not only include frequency components of the mixed highs but also frequencies of the red lows signal. The red and blue guns will similarly be supplied not only with components of the mixed highs but also with components of the green picture signal. In order to eliminate the effects of this frequency-interlacing of components of the several color signals, I make use of the phenomenon of persistence of vision, in combination with the particular frequency relationships which are selected for the intercarrier spacings. The undesired color components in the signals supplied to each electron gun are thereby effectively canceled out, so far as the eye of an observer is concerned, in a manner now to be described.

Figure 5:
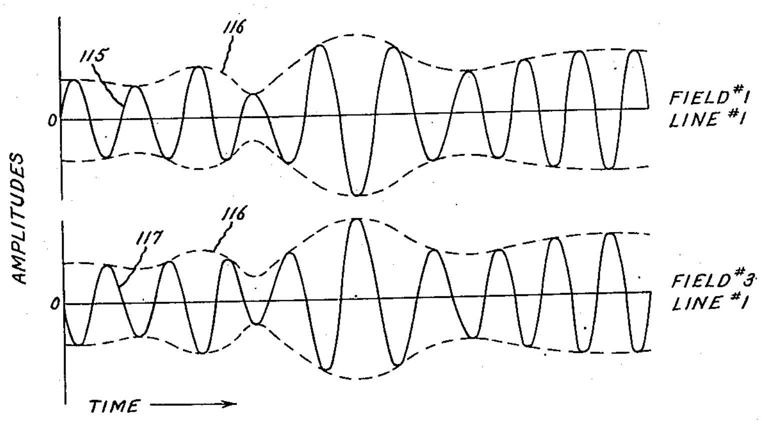
Fig. 5 is a group of electrical wave forms, on a common time axis, which will be referred to in analyzing the operation of the receiver of Fig. 4.

This cancellation phenomenon will be better understood by reference to the illustrative wave forms of Fig. 5, which shows two voltage wave forms on a common time scale. Let it be assumed that the cathode ray from the green electron gun is traversing a particular scanning line in a particular picture field, for example, line #1 in field #1. The intensity of the ray will of course be modulated during its traverse of the line in accordance with the intensity variations of the green signal. At the same time, it will also be modulated by the red subcarrier and its modulation components, since this subcarrier is in itself a video frequency lying within the frequency spectrum of the green signal. The modulated red subcarrier is represented in Fig. 5, during this scanning line, by the sine wave 115, its modulation being indicated by variations in the envelope 116. The intensity of the green scanning ray will therefore be correspondingly modulated to produce regularly-spaced intensified "dots" along the trace, corresponding to peaks of one polarity in the red subcarrier wave.

If the red subcarrier frequency were harmonically related to the line scanning frequency, these intensified "dots" would appear in the same space positions on consecutive scans of line #1, and a stationary interference pattern would result. However, in accordance with the preferred form of my invention, this frequency is an odd integral multiple of one-half the line scanning frequency. Therefore, on the next consecutive scan of this same line #1, occurring in field #3 (assuming conventional double-interlace), the red subcarrier wave will be as represented by wave 117 in Fig. 5. This is a wave modulated in the same manner as 115 but of precisely opposite phase. Therefore, the spaced points along the scanning line which were intensified in the first scan will now be correspondingly reduced in intensity during this scan. Due to the persistence of vision, these will be effectively cancelled out so that, to the eye of the observer, the red subcarrier merely produces a uniform background illumination of medium intensity.

This phenomenon is readily demonstrable in the laboratory by injecting a variable video-frequency sine wave into the picture channel of a conventional black-and-white television receiver. When the injected frequency is adjusted so as to be harmonically related to the line scanning frequency, a plurality of closely-spaced black vertical bars are readily apparent in the image. However, as the frequency is varied in one direction, these bars gradually disappear, resolving themselves into a minimum value of average background illumination when the video frequency is exactly equal to an odd multiple of one-half the scanning frequency. As the frequency is varied further in the same direction, another set of bars will appear to the eye when the next harmonic of the line scanning frequency is reached, and so on.

These same principles of cancellation likewise apply to all other modulation components of the red signal, so far as the green image is concerned, since they also have the required frequency relationships to modulate consecutive scans of each scanning line in opposite phases.

Any green components present in the output red signal to the red gun of the picture tube will likewise have opposite phases in the alternate picture fields and will likewise be cancelled out by the persistence of vision. Therefore the red channel will also have nearly perfect freedom from green channel cross-talk, thanks to the eye.

The same general considerations also hold for the blue channel, but in the particular system of transmission and reception illustrated by Figs. 3 and 4, the blue channel may be effectively considered as a separate channel which is not really interlaced with another channel. Therefore, simple band-pass and band-elimination filters will suffice to avoid any cross talk problems.

It will thus be apparent that the eye of the observer performs very efficiently what would otherwise require a very complex and costly circuit arrangement for filtering and sorting out the desired modulation components of the several signals.

In the receiving system of Fig. 4, a little residual interference from the low frequency red signal will exist in the green signal channel due to cross-modulation in the second detector 65 or other points in the system. In order to prevent this from appearing as a spurious component in the green picture image, it is only necessary to feed some red lows into the video mixer and amplifier 66 with opposite phase polarity from those generated in the green video channel. I have represented these corrective signals as being supplied over conductor 99 in Fig. 4. Tests have demonstrated that it is thus possible to eliminate this undesirable cross-modulation effect completely.

Figure 6:
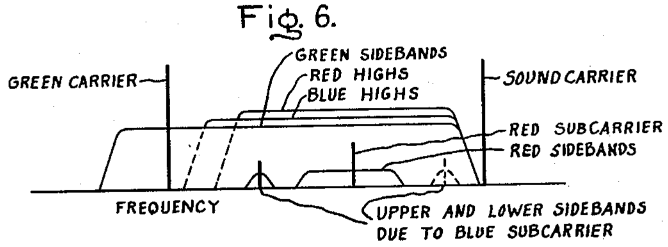
Fig. 6 is a conventionalized representation, similar to that of Fig. 3, of the frequency spectrum of a television signal which is a modification of that represented by Fig. 2.

Fig. 6 is another conventionalized representation of a composite television signal, similar to that of Fig. 2 but illustrating another mode of operation in accordance with my invention. In this modification the green carrier and sidebands, including the mixed highs, are transmitted in the same manner as before, and likewise the red subcarrier and its sidebands. However, in this modification a blue subcarrier and its sidebands are modulated upon the red subcarrier. This produces upper and lower sidebands of the red subcarrier, due to the blue subcarrier and its sidebands. The upper sideband thereof may be suppressed, if desired, by means of a suitable filter, and is therefore indicated only in dashed outline in Fig. 6.

Figure 7:
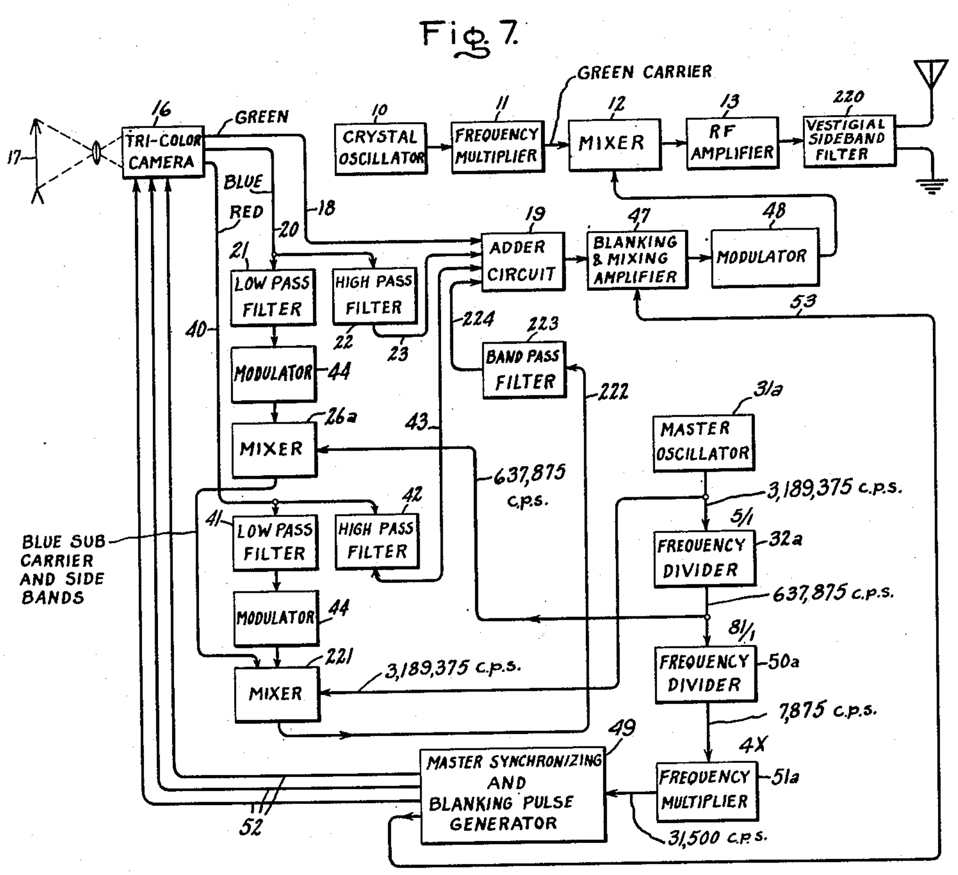
Fig. 7 is a one-line block diagram of another form of color television transmitter embodying my invention, for radiating the signals represented in Fig. 6.

Fig. 7 is a block diagram of a suitable color television transmitter for radiating the signal of Fig. 6. Many of the component circuits thereof are the same as those previously described in detail with respect to Fig. 3. They are therefore indicated by corresponding reference numerals and need not be further described. Those elements of Fig. 7 which are not identical to those of Fig. 3, but whose functions are the same, are also indicated by corresponding reference numerals with the suffix letter "*a*" added.

In the transmitter of Fig. 7, the green carrier is produced and modulated in the same manner as previously described. Vestigial sideband transmission is likewise obtained in any suitable manner known to the art, for example by the use of a vestigial sideband filter 220 at the transmitter output. The design of such filters is also well-known to the art and forms no part of my invention. For further detailed information reference may be made to the article beginning at page 115 of the "Proceedings of the I. R. E.," March 1941 or to the article beginning at page 301 of the "R. C. A. Review," January 1941.

In the transmitter of Fig. 7, the mode of generating the three color signal components, and of separating out and adding together the mixed highs may likewise be the same as that previously described. Fig. 7 illustrates one other possible set of frequency relationships for the master oscillator and its associated frequency divider and frequency multiplier chain, for obtaining suitable subcarrier and synchronizing frequencies. Thus, the master oscillator 31*a* may generate a frequency of 3,189,375 C. P. S., which is used as the red subcarrier frequency, this being the 405th harmonic of 7875 C. P. S. By dividing in a ratio of 5 to 1 in frequency divider 32*a*, the blue subcarrier frequency is derived, equal to 637,875 C. P. S., which is the 81st harmonic of 7875 C. P. S. For the purpose of controlling the master synchronizing and blanking pulse generator, this may be divided down in a ratio of 81 to 1 in divider 50*a* and then multiplied by a factor of 4 in multiplier 51*a* to obtain the required frequency of 31,500 C. P. S.

In Fig. 7, the blue lows are modulated upon the 637,875 C. P. S. subcarrier in a mixer 26*a*. The red lows are modulated upon the 3,189,375 C. P. S. subcarrier in a mixer 221, to which is also supplied the output of mixer 26*a* in order to produce the blue subcarrier sidebands of Fig. 6. The output of mixer 221 is supplied over conductor 222 to a band pass filter 223 in which the upper sideband due to the blue subcarrier is eliminated before the resultant signal is supplied over conductor 224 to the adder circuit 19.

It is believed unnecessary to illustrate or describe in detail a color television receiver suitable for receiving the signal of Fig. 6, since the principles of separation of the red and blue subcarriers and their sidebands may each be substantially the same as that employed in the receiver of Fig. 4 for the separation of the red lows signal.

Figure 8:
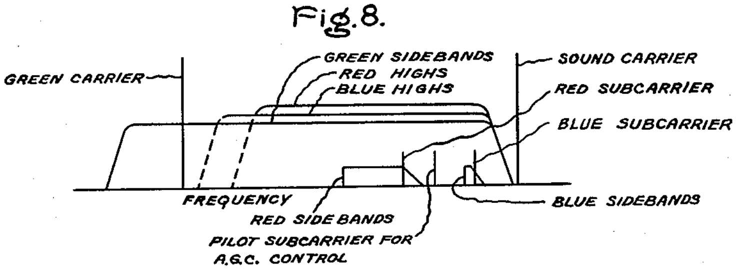
Fig. 8 is an other conventionalized representation of the frequency spectrum of a further modification of the television signal of Fig. 2.

Still another, and preferred, mode of operation in accordance with the principles of my invention, is illustrated by the composite picture signal of Fig. 8. In this modification the green carrier, the green sidebands and the mixed highs may be transmitted in the same manner as in previously-described embodiments. However, in this modification, the red and blue subcarriers are each separately modulated upon the green carrier and spaced in frequency from the green carrier as shown in Fig. 8, so as to lie at two different frequencies within the upper sidebands of the green carrier. Of course, the intercarrier spacings are again selected in accordance with the fundamental principles of my invention to provide frequency-interlace with the modulation components of the green signal. A further feature of this embodiment is the fact that I preferably employ vestigial sideband transmission for each of the red and blue subcarriers, the upper sidebands of each being partially suppressed, as illustrated.

Another modification in the mode of transmission illustrated by Fig. 8 is the additional transmission of a separate pilot subcarrier within another portion of the spectrum of the green sidebands, for automatic gain control (A. G. C.) purposes shortly to be described. Preferably, as shown in Fig. 8 this pilot subcarrier is located between the adjacent sidebands of the red and green subcarriers.

Figure 9:
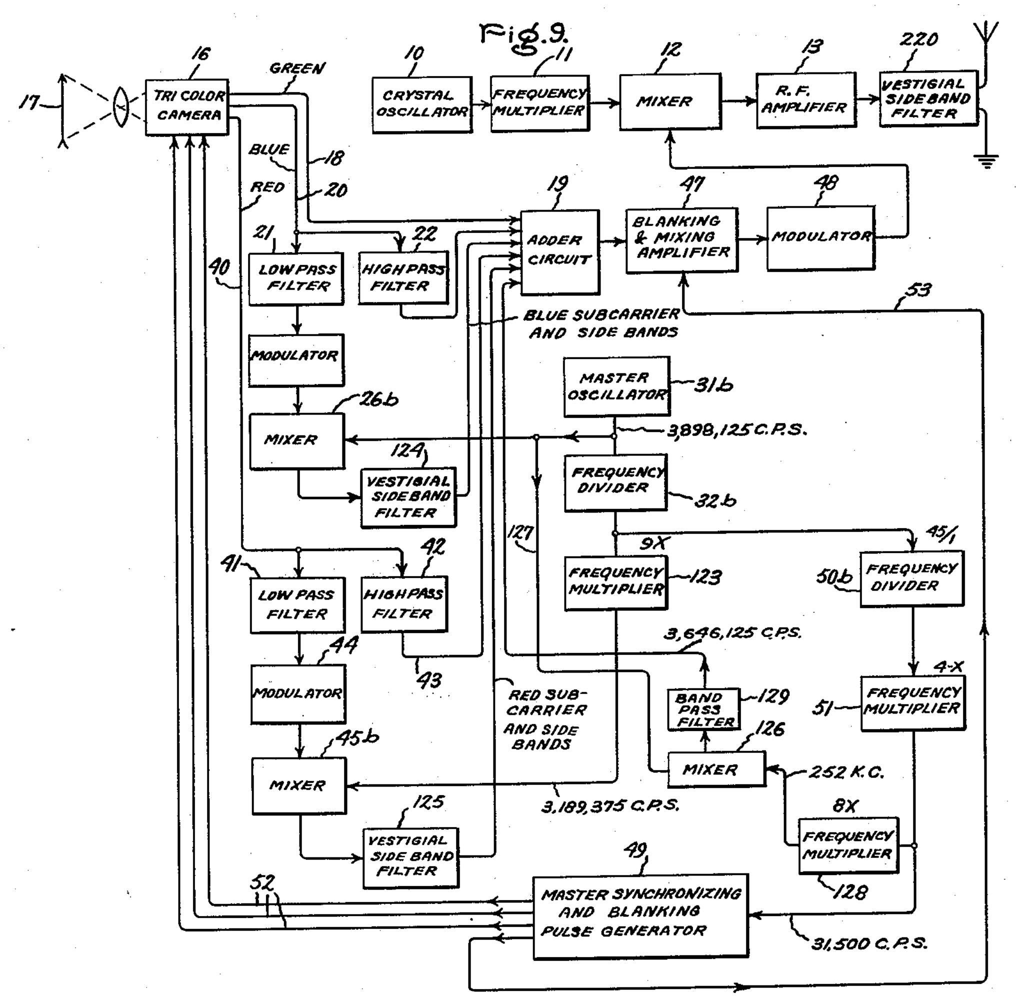
Fig. 9 is a one-line block diagram of a third form of color television transmitter embodying my invention, and adapted to radiate the signals represented in Fig. 8.

Fig. 9 is a simplified block diagram of a color television transmitter suitable for generating the signal of Fig. 8. As in the case of Fig. 7, many of the circuit components of Fig. 9 may be identical to those of Fig. 3, and they are again indicated by the same reference numerals for convenience of comparison. Circuit elements which are not identical to those of Fig. 3, but which have the same functions, are indicated in Fig. 9 by corresponding reference numerals with the suffix letter "*b*" added.

Fig. 9 also illustrates another possible combination of frequencies which might be employed to generate the required subcarriers in a system conforming to present television standards. Thus, the master oscillator 31b is represented as generating a frequency of 3,898,125 C. P. S., which is utilized directly as the blue subcarrier, and supplied to mixer 26b where it is modulated by the blue lows. It will be noted that this frequency is the 495th harmonic of 7875 C. P. S., thus fulfilling the basic requirement that it be an odd integral multiple of one-half the line scanning frequency.

A suitable red subcarrier frequency may be obtained, as shown in Fig. 9, by first dividing the master oscillator frequency in the ratio of 11 to 1 in the frequency divider 32b and then multiplying it by a factor of 9 in a frequency multiplier 123. This results in a red subcarrier frequency of 3,189,375 C. P. S. which also fulfills the basic frequency requirements, since it is the 405th multiple of 7875 C. P. S. It will be of course obvious that this frequency can be derived in other ways. The rule is to divide the basic oscillator frequency by an odd number and then to multiply the resultant frequency by another odd number.

The red lows from the modulator 44 in Fig. 9 are modulated on the red subcarrier in the mixer 45b. The outputs of the two mixers 26b and 45b are each then supplied to separate inputs of the adder circuit 19, through suitable vestigial sideband filters 124 and 125, respectively, whose frequency characteristics are designed to attenuate the upper sideband frequencies, in the manner indicated in Fig. 8.

Automatic gain control for the red and blue channels in the receiver may be referenced to a pilot subcarrier transmitted at a fixed amplitude and which is continuous except for blanking intervals. Such a reference wave may be conveniently inserted in the guard band between the red and blue signals, as indicated in Fig. 8. The frequency of the pilot subcarrier is chosen to lie midway between line-frequency harmonics of the green signal and can be generated as shown in Fig. 9. A mixer 126 is fed with two input signals, one of which is the master frequency from 31b over conductor 127, and the other of which is supplied from frequency multiplier 128. Multiplier 128 multiplies the 31,500 C. P. S. signal from multiplier 51 by a factor of 8, yielding 252,000 C. P. S. The output of mixer 126 passes through a band-pass filter 129 which is sharply tuned to the difference frequency, 3,646,125 C. P. S., and is thence fed into adder 19.

Figure 10:
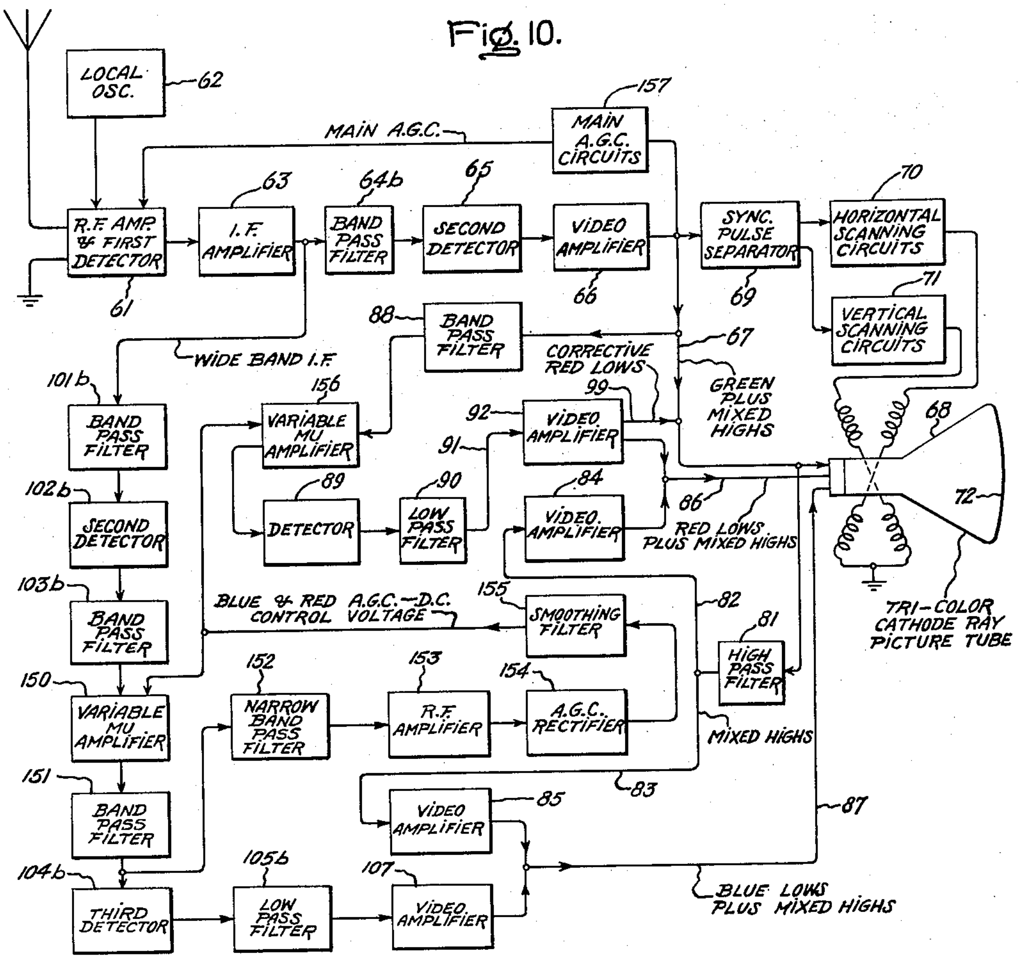
Fig. 10 is a one-line block diagram of a color television receiver for use with the transmitter of Fig. 9.

Fig. 10 is a simplified one-line block diagram of a color television receiver adapted to receive signals of the form represented in Fig. 8, from the transmitter of Fig. 9. Many of the component circuits thereof are the same as those previously described in detail with respect to Fig. 4. They are therefore indicated by corresponding reference numerals and need not be further described. Those elements of Fig. 10 which are not identical to those of Fig. 4, but whose functions are essentially the same, are also indicated by corresponding reference numerals with the suffix letter "b" added.

In the receiver of Fig. 10, the wide band of intermediate frequencies from I. F. amplifier 63 is passed through a band pass filter 64b which effectively removes the sound carrier wave which is located at a mean frequency 4.5 mc. above the green picture carrier. The pass band of this filter may be narrowed even more to attenuate the blue subcarrier at least partially. The wave leaving filter 64b therefore contains information associated with the green signal, the red signal, and the mixed highs as described in connection with Fig. 4. A band-pass filter 101b is designed to pass the intermediate frequency signal of the blue subcarrier as well as that of the green carrier and, since the blue carrier is farther removed in frequency from the green carrier than in the case of Fig. 4, filter 101b must have a correspondingly wider band-pass characteristic. Detector 102b combines the green and blue carriers to produce a difference frequency of 3,898,125 C. P. S., and this wave will have associated sidebands of blue lows. In addition, the output of detector 102b will contain the pilot subcarrier of 3,646,125 C. P. S. to be used for A. G. C. purposes. Detector 102b is followed by a band-pass filter 103b which passes freely that band of frequencies extending from about 3.6 mc. to 4.0 mc., but which offers high attenuation to the 4.5 mc. signal caused by the sound transmitter, and to the 3.18 mc. signal caused by the red subcarrier. The output of filter 103b passes through an amplifier 150 of a variable-mu type, adaptable to automatic gain control, and thence through a 3.6 to 4.0 mc. band-pass filter 151 to a third detector 104b. The output of detector 104b contains the blue lows, which are passed by low pass filter 105b. The latter filter offers high attenuation to 252 kc., the beat frequency between the blue subcarrier and the A. G. C. pilot frequency. It also offers good attenuation to beat frequencies between the blue subcarrier and the sound carrier at 4.5 mc., and between the blue subcarrier and the red subcarrier, as well as between the pilot carrier and the red subcarrier. Since all these unwanted frequencies lie above 0.2 mc., a well-constructed low pass filter can be used effectively.

Another circuit connection from the output of filter 151 leads to a narrow band-pass filter 152 tuned to pass the pilot frequency of 3,646,125 C. P. S. The output of filter 152 is amplified by a radio frequency amplifier 153 and the resultant wave is detected by a conventional amplitude detector, or A. G. C. rectifier, 154. Any alternating or variable components of the detector 154 are filtered out by a conventional smoothing filter 155, yielding a D. C. voltage suitable for A. G. C. purposes. This voltage is applied to a gain-control electrode of amplifier 150 to vary its gain in a manner well-known in the art. The output of amplifier 150 is thereby held more uniform than otherwise, the gain of device 150 varying in inverse relationship to the magnitude of the pilot carrier, and hence the blue signal which lies but 252 kc. from it.

A variable-mu amplifier 156 is also shown inserted in the red signal chain, between filter 88 and detector 89. A. G. C. control voltage from smoothing filter 155 also controls the gain of amplifier 156 in the same manner as described in connection with amplifier 150.

In this way, the red channel and the blue channel outputs are separately stabilized from the green channel output whose gain may be controlled by any conventional A. G. C. system 157 as currently used in broadcast receivers. Thus, any mistuning or local oscillator drift in the receiver which would tend to shift the position of the green carrier up or down the slope of the I. F. response characteristic, and which would thereby change the main receiver gain and tend to unbalance color rendition, is counteracted by the A. G. C. for the red and blue channels because the A. G. C. pilot frequency occurs where the intermediate frequency response is relatively flat.

The remainder of the receiver of Fig. 10 operates in the same manner as the receiver already described in connection with Fig. 4 and that description need not be repeated here.

The use of a common A. G. C. circuit for the red and blue channels is feasible where the red and blue signals maintain the same relative amplitudes, within practical limits. This should generally be the case in practice, but if not, separate pilot carriers can readily be transmitted for the red and blue signals. It will be obvious, from what has been said with reference to Fig. 10, how these two pilot frequencies can be filtered out, detected and used for separate A. G. C. of the amplifiers 150 and 156. It is only necessary to choose each pilot carrier frequency so that it is also spaced from the green carrier by an odd multiple of one-half the line scanning frequency, to avoid distortion of the observed images.

An adjustable delay bias voltage control may be provided for the A. G. C. rectifier 154, as well as separate manual gain controls for the red and blue channels, in the receiver of Fig. 10. This will permit the receiver readily to be adjusted for best color balance in the reproduced image.

Those skilled in the television art will understand that it will generally be desirable to employ separate D. C. restoration circuits in the receiver video amplifiers for the green signal, the red lows signal, and the blue lows signal.

Since the green, red and blue signal channels are designed to have different band-pass characteristics, those skilled in the art will also readily appreciate that the signals will suffer slightly different time delays in passing through the three channels, the narrowest channel introducing the greatest time delay. An over-all uniform time delay in each channel can readily be secured, however, by introducing well-known time-delay networks, such as artificial transmission line sections, into the proper channels. Since the blue lows channel can generally be the narrowest, it will generally be desirable to insert such time delay networks in the video circuits for the green signal and for the red lows signal in Fig. 10, each network being adjusted to give the same over-all time delay as the over-all time delay in the blue lows channel.

Similar time delay networks may also be inserted in the several transmitter circuits which supply the color signals to the adder 19 in Figs. 3, 7 and 9, in order to equalize the time delays in the various color components at the transmitter output. Such circuits may be required in the green and red lows inputs, and also in the red highs and blue highs inputs.

Color television receivers embodying my invention can readily be tuned to receive monochrome signals. In this case all three electron guns may be switched to connect them to the "green" channel, resulting in a green picture image, which is not unpleasing to the eye.

Conversely, a conventional monochrome receiver will, when tuned to the green picture carrier from my color transmitter, reproduce this signal in black-and-white. This will be of fully-acceptable quality, since it contains a full range of picture frequencies, based on dominant components of the scene. Cross-talk will cause no trouble because resultant picture distortion will be in geometrically the same position as the reproduced "green" signal. In fact, if the polarity of modulation is chosen carefully, the black-and-white tube may actually be aided by cross-talk signals which produce lights and shadows even when the green signal is weak.

Figure 11:
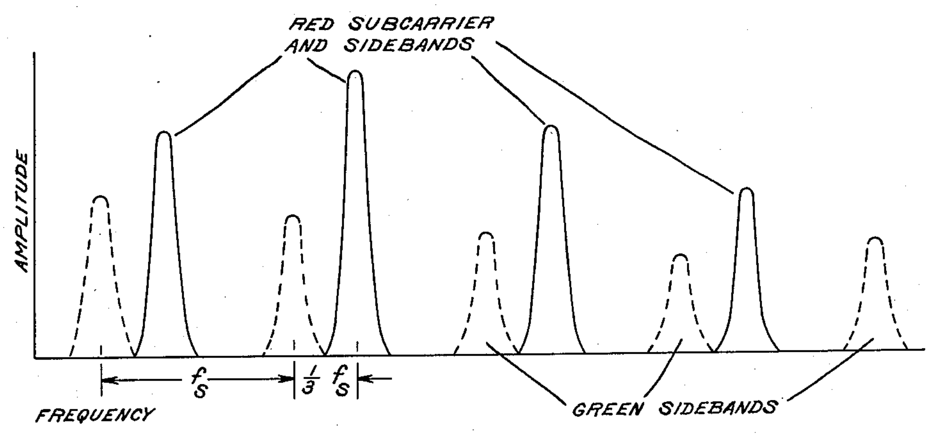
Figs. 11 and 12 are conventionalized electrical wave forms illustrating certain principles underlying a further modification of my invention.
Figure 12:
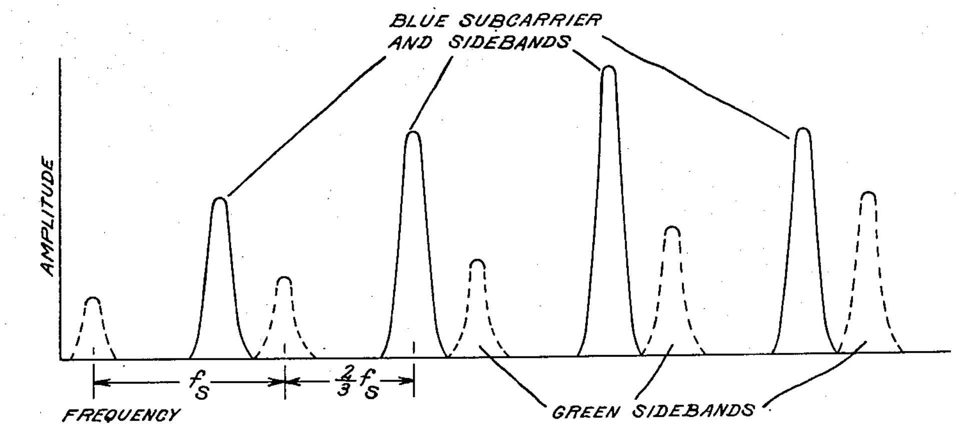

In the foregoing description of my invention, it has been indicated that the frequency separation between two carriers, whose components are interlaced in frequency, should preferably be exactly equal to an odd multiple of one-half the line scanning frequency. In other words:

$$f_d=(2n+1)\frac{f_s}{2} \qquad (1)$$

where
$f_d$=frequency separation between the carriers
$n$=any integer
$f_s$=line scanning frequency In its broader aspects, however, it is not essential that this exact relationship be observed. It is merely sufficient that the subcarrier frequencies each be substantially different from any integral multiple of the horizontal scanning frequency. For example, Fig. 11 illustrates, in somewhat conventionalized form, an interlaced relationship between the red subcarrier and its sidebands and the upper sidebands of the green carrier, in which the narrow bands of frequencies containing the useful signal information are spaced apart so that the red signal components lie above the corresponding green signal components by one-third the line scanning period. Fig. 12 shows a similar portion of the frequency spectrum of the composite picture signal in which the blue subcarrier and its sidebands are spaced above the corresponding sidebands of the green signal by two-thirds the line scanning period.

With the particular frequency relationships illustrated in Figs. 11 and 12, it will take more than two consecutive scans of the same line in each color image to produce a total brightness variation in any one picture element giving the cancellation effect previously described in connection with Fig. 5. In the particular example illustrated in Fig. 11, it will take ten complete picture frames to complete one cycle of brightness variation in the interference pattern in each image. Frequency spacings differing from one-half the line scanning period therefore introduce what may be termed a "flicker frequency" into the interference pattern observed by the eye. However, if the two subcarriers are sufficiently different in spacing from the green carrier, so that the interference pattern on the screen is relatively fine, the observer will not be particularly distracted by such periodic brightness variations. The advantage of such an unsymmetrical frequency interlace is that it requires less complicated filter circuits to provide adequate frequency separation between the two subcarriers. Thus, the disadvantage of the "flicker frequency" may be more than offset, in some applications of my invention, by the practical advantages resulting from the use of less complicated and less expensive filters in the system.

It will thus be apparent that my improved frequency interlace system and method possesses many advantages, particularly in its application to high-fidelity three-color television transmission and reception. The required transmission band need be no wider than that for transmission of monochrome pictures of equivalent detail and the system is fully compatible.

The inherent characteristics of the system are such that the receiver image should be practically immune to color shifts due to noise interference, and should exhibit a complete absence from "twinkle," "crawl" or "flicker" when properly adjusted.

It will also be noted that all precision frequency control and synchronizing equipment is localized at the color transmitter, so that the color receiver can be relatively low in cost, reliable in operation, easy to adjust and maintain, and simple in construction.

While certain specific embodiments of my invention have been shown and described, it will of course be understood that various other modifications may be made without departing from the principles of the invention. The appended claims are therefore intended to cover any such modifications within the true spirit and scope of the invention.

What I claim as new and desire to secure by Letters Patent of the United States is:

1. The method of simultaneously translating two complex electrical signals through a common signal channel, both of said signals being of a type including frequency components extending over a frequency range but largely concentrated at or near a plurality of different discrete frequencies lying within said range and equal to integral multiples of a common frequency, comprising the steps of modulating one of said signals on a carrier wave to produce component sideband frequencies, modulating the other of said signals on a subcarrier wave having a frequency lying within said range and differing from an integral multiple of said common frequency to produce other component sideband frequencies, additionally modulating said subcarrier wave and said other sideband frequencies on said first carrier wave, and impressing said modulated carrier wave and sidebands thereof on said signal channel.

2. The method of simultaneously translating two complex electrical signals through a common signal channel capable of passing frequencies within a relatively-wide pass band, both of said signals being of a type including frequency components extending over a frequency range but largely concentrated within a plurality of different, relatively-narrow frequency bands lying within said range and substantially equally spaced apart by integral multiples of a common frequency, comprising the steps of modulating one of said signals on a carrier wave to produce a first group of component sideband frequencies within said pass band, modulating the other of said signals on a subcarrier wave having a frequency lying within said range and differing from an odd integral multiple of said common frequency by substantially one-half said common frequency to produce another group of component sideband frequencies, additionally modulating said subcarrier wave and said other component frequencies on said first carrier wave to produce a second group of sideband frequencies lying within said pass band but interlaced in frequency with the frequencies of said first group, and impressing said modulated carrier wave and sideband frequencies thereof on said signal channel.

3. In the art of color television, the method of operation comprising the steps of concurrently generating at least two independent television picture signals at the same line scanning frequency, each signal representing a different primary color characteristic of a colored scene, modulating one of said picture signals on a high frequency carrier wave to produce principal sideband components thereof lying within a predetermined frequency band, modulating the other of said picture signals on a subcarrier wave having a frequency lying within said band and equal to an odd integral multiple of one-half said line scanning frequency, selecting said subcarrier wave and principal sideband components thereof lying within a substantially narrower frequency band within said predetermined band, additionally modulating said selected subcarrier and components on said carrier wave, and transmitting said carrier wave and all said modulation components within said predetermined band over a single frequency channel.

4. In the art of color television, the method of operation comprising the steps of concurrently generating at least two independent television picture signals at the same line scanning frequency, each signal representing a different primary color characteristic of a colored scene, modulating one of said picture signals on a high frequency carrier wave to produce principal sideband components thereof lying within a predetermined frequency band, modulating the other of said picture signals on a subcarrier wave having a frequency lying within said band and equal to an odd integral multiple of one-half said line scanning frequency, selecting said subcarrier wave and principal sideband components thereof lying within a substantially narrower frequency band within said predetermined band, additionally modulating said selected subcarrier and components on said carrier wave, transmitting said carrier wave and all said modulation components within said predetermined band over a single frequency channel, receiving said modulated carrier wave and demodulating it to produce a video signal containing substantially all said components, utilizing said video signal to produce a first picture image in the color represented by said one picture signal, selecting from said video signal a narrower range of video frequency components including said subcarrier and principal sidebands thereof, utilizing said selected video components to produce a second picture image in the color represented by said other picture signal, and superimposing said images for optical viewing.

5. A simultaneous color television system comprising means for synchronously generating at least two independent, complex picture signals each resulting from scanning a colored scene at the same line scanning frequency and representing a different primary color component of said scene, means for modulating one of said signals on a first carrier wave to produce a first group of sidebands extending over a predetermined frequency band, means for selecting a band of lower-order frequency components of said other signal, means for modulating said selected components on a second carrier wave to produce a second group of sidebands extending over a narrower band, means for establishing the frequencies of said carrier waves with the frequency spacing between them substantially equal to an odd integral multiple of one-half said scanning frequency so that said second carrier wave and its group of sidebands lie within a portion of said frequency band in frequency-interlaced relation with said first group of sidebands, means for combining all the frequency components of both said modulated carrier waves within said band to form a composite signal, means for transmitting said composite signal, means for receiving said composite signal, said receiving means including a plurality of cathode ray means each adapted to be synchronized at said scanning frequency and to produce an image in one of said primary colors in response to energization of a control electrode thereof, means for demodulating said received signal and utilizing it to synchronize all said cathode ray means, means for impressing the demodulated components on one of said control electrodes, means for selecting the portion of said band including said second carrier wave and its sidebands, means for separately demodulating said second carrier, and means for impressing the demodulated components of said second carrier on another of said control electrodes.

6. A simultaneous frequency-interlaced color television system comprising means for concurrently generating two independent, complex picture signals each resulting from scanning a colored scene at the same line scanning frequency and representing a different primary color component of said scene, means for modulating one of said signals on a first carrier wave to produce a first group of principal sidebands extending over a predetermined frequency band, frequency-selective means for selecting a band of lower-order frequency components of said other signals, means for modulating said selected components on a second carrier wave to produce a second group of principal sidebands extending over a narrower band, means for generating said carrier waves with the frequency spacing between them substantially equal to an odd integral multiple of one-half said scanning frequency so that second carrier wave and its group of sidebands lie within a portion of said frequency band, means for transmitting all the frequency components of both said modulated carrier waves within said band as a single composite signal, means for receiving said composite signal, means for demodulating said first carrier wave to produce a video wave, a pair of cathode ray scanning means each adapted to produce a scanning pattern at said line scanning frequency on a fluoroescent screen and in a corresponding primary color, said patterns being positioned in optical registry for viewing, an intensity control electrode in each said cathode ray means, means for impressing said video wave on one of said electrodes, frequency-selective means for selecting a narrower band from said composite signal including said second carrier and sidebands, means for demodulating said second carrier wave to produce a second video signal, and means for impressing said second video wave on said other control electrode.

7. A simultaneous color television transmitting system comprising means for concurrently generating three independent, complex picture signals each resulting from scanning a colored scene at the same line scanning frequency and each representing a different primary color component of said scene, means for modulating one of said signals on a first carrier wave to produce a first group of sidebands extending over a predetermined frequency band, means comprising a pair of high-pass filters for respectively selecting higher-order frequency components from each of said other two signals, means for additionally modulating said higher-order components on said first carrier wave, means comprising a pair of low-pass filters for selecting respective lower-order frequency components from each of said other two signals, means for modulating said lower-order components on second and third carrier waves respectively, means establishing the frequencies of said second and third carrier waves within said predetermined frequency band and spaced from said first carrier wave by different odd integral multiples of one-half said scanning frequency whereby said second and third carrier waves and sidebands thereof lie within said predetermined frequency band in non-overlapping, frequency-interlaced relation with said first group of sidebands, and means for combining all the frequency components of said three modulated carrier waves within said predetermined frequency range to form a composite signal.

8. A simultaneous color television transmitter comprising camera means for synchronously scanning a colored scene at a predetermined line scanning frequency and for generating green, red and blue video signals respectively representative of the corresponding primary color components of said scene, filtering means for selecting, from each of said red and blue signals, substantially contiguous bands of higher and lower frequency components thereof, means for modulating the selected higher frequency components of both said red and blue signals and also said green signal upon a main carrier, thereby to produce a plurality of modulation frequency components lying within a predetermined frequency band, means for separately modulating the selected lower frequency components of said red and blue signals on two separate subcarriers, means establishing the frequency of each of said subcarriers within said band and equal to a different odd integral multiple of one-half said line scanning frequency, filtering means for restricting the modulation sidebands of each said subcarriers to non-overlapping narrower bands within said predetermined band, means for additionally modulating each of said subcarriers and its restricted sidebands on said main carrier, and means for transmitting said carrier and all modulation frequencies thereof within said band as a single composite television picture signal.

9. A simultaneous color television transmitter comprising camera means for synchronously scanning a colored scene at a predetermined line scanning frequency and for generating green, red and blue video signals respectively representative of the corresponding primary color components of said scene, filtering means for selecting, from each of said red and blue signals, bands of higher and lower frequency components thereof, means for adding the selected higher frequency components of both said red and blue signals to said green signal and for modulating all of them on a first carrier, thereby to create a plurality of modulation frequencies lying within a predetermined frequency band, means for separately modulating the selected lower frequency components of said red and blue signals on two additional carriers, means establishing the frequency of each of said additional carriers within said band and separated from said first carrier frequency by different frequency spacings each of said spacings being substantially equal to an odd integral multiple of one-half said line scanning frequency, and means for transmitting said three carriers, and all modulation components thereof lying within said band, as a composite television picture signal.

10. A color television receiver for receiving a composite television picture signal of the type transmitted by the transmitter of claim 9, comprising three cathode ray means respectively having green, red and blue intensity control electrodes, said means being arranged to be synchronized at the line scanning frequency and to produce scanning images in the three corresponding primary colors, means for demodulating said signal and synchronizing the scanning of all said cathode ray means therewith, means for impressing all the demodulated picture signal frequencies of said signal on said green electrode, filtering means for selecting bands of frequencies from said demodulated signal including the higher and lower frequency components of the red and blue signals respectively, means for concurrently impressing said higher frequency red and blue components on both said red and blue electrodes, and means for separately impressing said lower frequency red and blue components on the respective red and blue electrodes.

11. A color television receiver for receiving a composite television picture signal of the type transmitted by the transmitter of claim 9, comprising three cathode ray means respectively having green, red and blue intensity control electrodes, said means being arranged to be synchronized at the line scanning frequency and to produce scanning images in the three corresponding pirmary colors, means for demodulating said signal and synchronizing the scanning of all said cathode ray means therewith, means for impressing all the demodulated picture signal frequencies of said signal on said green electrode, filtering means for selecting bands of frequencies from said demodulated signal including the higher and lower frequency components of the red and blue signals respectively, means for impressing said higher frequency red and blue components on both said red and blue electrodes, and additional means for impressing at least one of said lower frequency components on the green electrode in opposing phase to corresponding frequency components supplied thereto directly from said demodulating means.

12. In a color television receiver including means for receiving, from a single signal channel, two simultaneous composite television signals lying within the same frequency range and each comprising a plurality of equally spaced, narrow bands of principal modulation components resulting from simultaneous scanning of a different color characteristic of a colored scene, one of said signals comprising a subcarrier and sidebands thereof interlaced in frequency in non-overlapping relation with a portion of the sidebands of the carrier of the other signal, a pair of cathode ray scanning means each adapted to produce a scanning pattern on a fluorescent screen in a corresponding color, said patterns being arranged in optical registry for viewing, an intensity control electrode in each said scanning means, means controlled by said received signals for synchronizing the scanning patterns of each said cathode ray means with the scanning of said scene, means for detecting all components of said signals within said range and for utilizing them to energize one of said electrodes, frequency-selective means for selecting a band of said detected signals corresponding to said subcarrier and sidebands within said portion of said range, and means for utilizing said selected components to energize said other electrode.

13. In a color television receiver including means for receiving, from a single signal channel, two simultaneous composite television signals lying within the same frequency range and each comprising a plurality of equally-spaced, narrow bands of principal modulation components resulting from simultaneous scanning of a different color characteristic of a colored scene, one of said signals comprising a subcarrier and sidebands thereof interlaced in frequency in non-overlapping relation with higher order sidebands of the carrier of the other signal, a pair of cathode ray scanning means each adapted to produce a scanning pattern on a fluorescent screen in a corresponding color, said patterns being arranged in optical registry for viewing, an intensity control electrode in each said scanning means, means controlled by said received signals for synchronizing the scanning patterns of each said cathode ray means with the scanning of said scene, a first demodulating means for detecting all components of said signals within said range and impressing them on one of said electrodes, frequency-selective means for selecting components including only said subcarrier and sidebands within a portion of said range, a second demodulating means for detecting said selected components and impressing them on said other electrode, and means for additionally impressing said selected, demodulated components on said first electrode in opposite phase to the corresponding components supplied from said first demodulating means.

14. In a color television receiver including means for receiving, from a single signal channel, at least two simultaneous composite television signals lying within the same frequency range and each comprising a carrier and a plurality of equally-spaced, narrow bands of principal modulation components resulting from simultaneous scanning of a different color characteristic of a colored scene, one of said signals comprising a carrier and principal sideband components thereof interlaced in frequency in non-overlapping relation with principal sideband components of the other signal, a pair of cathode ray scanning means each adapted to produce a scanning pattern on a fluorescent screen in a corresponding color, said patterns being arranged in optical registry for viewing, intensity control means for each of said scanning means, means controlled by said received signals for synchronizing the scanning patterns of each said cathode ray means with the scanning of said scene, means for detecting modulation components of both said signals within said range and impressing them on one of said control means, frequency-selective means for selecting a band of signal components including only the carrier and principal sidebands of said one signal, means for detecting said selected signal components and impressing them on said other control means, and means for additionally impressing said selected, demodulated components on said first control means in opposite phase to the corresponding components supplied from said first detecting means.

15. In a multiplex television receiver including means for simultaneously receiving a plurality of waves including at least two composite television signals lying within the same frequency range and resulting from simultaneous scanning of a different optical characteristic of a scene, one of said signals comprising a subcarrier and principal sidebands thereof interlaced in frequency in non-overlapping relation with a portion of the sidebands of the carrier of the other signal, said waves also including a separate control frequency wave lying within said range and interlaced in frequency with other sidebands of said other signal, a pair of cathode ray means each adapted to produce a scanning pattern on a fluorescent screen, said patterns being arranged in optical registry for viewing, intensity control means for each of said cathode ray means, means controlled by said received signals for synchronizing the scanning patterns of each said cathode ray means with the scanning of said scene, means for detecting modulation components of said carrier within said range and impressing them on one of said control means, frequency-selective means for selecting a narrower band of signal components including said subcarrier and principal sidebands, means for detecting said selected components and impressing them on said other intensity control means, means for separately selecting and detecting said control frequency, and automatic gain control means responsive to said detected frequency for independently controlling the average amplitude of the signals impressed on said other intensity control means.

16. In a color television receiver including means for receiving a plurality of waves including at least two composite television signals lying within the same frequency range and each resulting from simultaneous line scanning of a different color characteristic of a colored scene, one of said signals comprising a first carrier and principal sidebands thereof extending over said range, the other of said signals comprising a second carrier and principal sidebands thereof extending over a fraction of said band, said carriers being spaced apart by an odd multiple of one-half said line scanning frequency, said waves also including a separate pilot carrier wave lying in a different fraction of said range and also spaced from said first carrier by an odd multiple of one-half the line scanning frequency, a pair of cathode ray means each adapted to produce a scanning pattern on a fluorescent screen in a corresponding color, said patterns being arranged in optical registry for viewing, intensity control means for each of said cathode ray means, means controlled by said received signals for synchronizing the scanning patterns of each said cathode ray means with the scanning of said scene, means for detecting modulation components of said signals within said range and impressing them on one of said control means, frequency-selective means for selecting a narrower band of signal components including said subcarrier and sidebands within said fraction of said range, means for detecting said selected components and impressing them on said other intensity control means, frequency-selective means for separately selecting a vary narrow band including said pilot carrier wave, and automatic gain control means responsive to said pilot wave for independently controlling the average amplitude of said selected components.

17. In a color television receiver including means for receiving, from a single signal channel, a plurality of waves including two simultaneous composite television signals lying within the same frequency range and each comprising a plurality of equally spaced, narrow bands of principal modulation components resulting from simultaneous scanning of a different color characteristic of a colored scene, one of said signals comprising a subcarrier and sidebands thereof interlaced in frequency in non-overlapping relation with higher order sidebands of the carrier of the other signal, said waves also including a separate pilot subcarrier wave similarly interlaced in frequency with other sidebands of said other signal, a pair of cathode ray scanning means each adapted to produce a scanning pattern on a fluorescent screen in a corresponding color, said patterns being arranged in effective optical registry for viewing, an intensity control electrode in each said scanning means, means controlled by said received signals for synchronizing the scanning patterns of each said cathode ray means with the scanning of said scene, a first demodulating means for detecting all components of said signals within said range and impressing them on one of said electrodes, frequency-selective means for selecting components including only said subcarrier and sidebands within a portion of said range, a second demodulating means for detecting said selected components and impressing them on said other electrode, a second frequency-selective means for selecting said pilot wave, means for demodulating said pilot wave, and an automatic gain control circuit controlled by said demodulated wave for independently controlling the amplitude of signals impressed on said other electrode.

18. A simultaneous color television transmitter comprising camera means for synchronously scanning a colored scene at a predetermined line scanning frequency and for generating first, second, and third video signals respectively representative of the corresponding primary color components of said scene, filtering means for selecting, from each of said first and second signals, bands of higher and lower frequency components thereof, means for adding the selected higher frequency components of both said first and second signals to said third signal and for modulating all of them on a first carrier, thereby to create a plurality of modulation frequencies lying within a predetermined frequency band, means for separately modulating the selected lower frequency components of said first and second signals on second and third carriers, means establishing substantially different frequencies for said second and third carriers lying within said band and each separated from said first carrier frequency by substantially an odd integral multiple of one-half said line scanning frequency, the principal modulation components of said second and third carriers lying in non-overlapping relation within said band and means for transmitting said three carriers, and all modulation components thereof lying within said band, as a composite color television picture signal.

19. A system for simultaneously multiplexing three color facsimile signals in a single signal channel capable of translating a frequency band of predetermined width, comprising means for concurrently scanning a colored scene at a predetermined scanning frequency and developing therefrom first, second and third picture signals respectively corresponding to the primary color components of said scene, means for modulating said first picture signal on a main carrier to produce modulation sidebands extending over said band, means for respectively modulating said second and third picture signals on separate subcarriers lying within said band, means establishing the frequencies of said subcarriers equal to different, odd, integral multiples of one-half said line scanning frequency, frequency-selective means for selecting each of said subcarriers and a limited range of modulation sidebands thereof arranged to lie within narrower, non-overlapping bands within said first band when modulated on said main carrier, and means for modulating both said subcarriers and limited modulation components on said main carrier.

20. A multiplex television transmitting system comprising means for generating at least two picture signals each resulting from scanning a scene in a predetermined pattern at the same line scanning frequency and each representing a different optical characteristic of said scene, means for modulating each of said signals on a different carrier wave, means establishing the frequencies of said carrier waves with their frequency spacing substantially equal to an odd integral multiple of one-half said scanning frequency so that component frequencies of said carriers and at least one of each of their sidebands lie within the same frequency band in frequency-interlaced relation, means for combining said waves and for transmitting over a common signal channel all components of said combined waves lying within said frequency band, means for receiving said combined waves, a pair of cathode ray scanning means each including a fluorescent screen and an intensity control electrode, said screens being arranged in effective optical registry as seen by the eye of an observer, means controlled by the received waves for synchronizing both said scanning means with the scanning of the scene so as to produce corresponding, optically-superimposed, scanning patterns, means for demodulating said received waves with respect to each of said carriers so as to produce two composite video signals each including desired components of one of said signals as well as undesired components of the other signal, and means energizing each of said control electrodes in accordance with a different one of said video signals.

21. A multiplex television system comprising means for synchronously generating at least two, independent, complex picture signals, each resulting from scanning a scene in a predetermined pattern at the same line scanning frequency and each representing a different optical characteristic of said scene, means for modulating a first one of said signals on a main carrier wave to produce a first group of selected sidebands extending over a predetermined frequency band, frequency-selective means for selecting a band of lower-order frequency components of said other signal, means for modulating said selected components on a subcarrier wave to produce a second group of selected sidebands extending over a narrower band, means for modulating said subcarrier and its selected sidebands on said main carrier, means establishing the frequency of said subcarrier substantially equal to an odd integral multiple of one-half said scanning frequency so that the resultant sideband components due to said subcarrier and its selected sidebands lie within a portion of said predetermined band, means for transmitting said modulated carrier wave, means for receiving said modulated carrier wave, means for demodulating said received wave to produce a band of video signals including all said selected sidebands and said subcarrier wave, a pair of cathode ray scanning means each having a fluorescent screen and an intensity-control electrode, means utilizing said video signals to synchronize the scanning of said scanning means at said line frequency, said scanning means being arranged to produce corresponding scanning patterns on said fluorescent screens in optically-superimposed relation for viewing, means energizing one of said electrodes in response to all said video signals, frequency-selective means for selecting a narrower band of components of said video signals including said subcarrier wave and its selected sideband components, and means energizing the other of said electrodes in response to said selected, narrower band of components.

22. In a simultaneous color television system, means for synchronously scanning a colored scene at a predetermined line scanning frequency and for simultaneously developing three partial image signals, each corresponding to a different primary color component of said scene and comprising a range of frequency components largely concentrated at or near integral multiples of said scanning frequency, means for generating a carrier wave, means for modulating a relatively-wide band of components of a first one of said signals on said carrier wave so as to produce a first band of modulation components, means for respectively modulating selected, substantially narrower bands of components of said second and third signals upon said wave so as to produce second and third bands of modulation components lying within mutually-exclusive portions of said first band and in frequency-interlaced relation to the modulation components of said first band, means for transmitting said modulated carrier wave, means for receiving and demodulating said wave to reproduce its signal components, three cathode ray scanning means arranged to be synchronized with said received wave and to produce three partial images in the respective primary colors in optically-superimposed relation, an intensity-control electrode for each said cathode ray means, means for selecting a relatively-wide band of reproduced components including those of said first band, means for respectively selecting relatively-narrow bands of reproduced components including those of said second and third bands, and means utilizing each of said three selected bands of reproduced components to energize a respective one of said intensity-control electrodes.

23. In a multiplex television system, means for synchronously scanning a scene at a predetermined line scanning frequency and for simultaneously developing three partial image signals each corresponding to a different optical characteristic of said scene, said signals each comprising a range of frequency components concentrated at or near integral multiples of said scanning frequency, means for generating a carrier wave, means for modulating a predetermined wide band of components of said first signal on said wave, means for modulating a selected, narrower band of components of said second signal on said wave so as to lie within a portion of said band in frequency-interlaced relation to certain of said first components, and means for additionally modulating a selected narrower band of components of said third signal on said wave so as to lie within a different, non-overlapping portion of said band in frequency-interlaced relation to others of said first components.

24. In a simultaneous facsimile transmission system, means for synchronously scanning a scene at a predetermined line scanning frequency and for simultaneously developing three partial image signals, each corresponding to a different optical component of said scene and comprising a range of frequency components largely concentrated at or near integral multiples of said scanning frequency, means for generating a carrier wave, means for modulating a relatively-wide band of components of a first one of said signals on said carrier wave so as to produce a first band of modulation components, means for respectively modulating selected, substantially narrower bands of components of said second and third signals upon said wave so as to produce second and third bands of modulation components lying within mutually-exclusive portions of said first band and in frequency-interlaced relation to the modulation components of said first band, and means for transmitting said multiple-modulated carrier wave.

25. In a multiplex television receiver including means for receiving, from a single signal channel, two simultaneous composite television signals lying within the same frequency range and each comprising a plurality of equally spaced, narrow bands of principal modulation components resulting from the simultaneous scanning of a different optical characteristic of a scene, one of said signals comprising a subcarrier and sidebands thereof interlaced in frequency in non-interfering relation with a portion of the sidebands of the carrier of the other signal, a pair of cathode ray scanning means each including a fluorescent screen and an intensity-control electrode, said screens being arranged in effective optical registry as seen by the eye of an observer, means controlled by the received signals for synchronizing both of said scanning means with the scanning of said scene so as to produce optically-superimposed scanning patterns, means for detecting all components of said two signals and developing a composite video signal having frequency components corresponding to the components of both said signals, means utilizing said video signal to energize one of said electrodes, frequency-selective means for selecting a portion only of the components of said video signal including said subcarrier and sidebands thereof, and means utilizing said selected portion of said video signal for energizing said other electrode.

26. A color television receiver for reproducing a colored scene in response to receipt of a composite television signal comprising three simultaneous image signals produced by the synchronous scanning of said scene in a predetermined pattern, each of said signals corresponding to a different primary color component of said scene, one of said signals having its major frequency components extending over a relatively-wide band and the other two of said signals having their major components extending over mutually-exclusive narrower bands each interlaced in frequency with components of said first signal, comprising three cathode ray scanning means arranged to be synchronized by said composite signal to scan synchronously in said pattern and to produce an image on a fluorescent screen in a different one of said primary colors, means effectively superimposing said images in optical registry for viewing, a ray-intensity control electrode for each of said scanning means, means for detecting said signals, means for energizing one of said electrodes in response to the detected signal components within said wide band, frequency-selective means for selecting two bands of detected components respectively including the components of said two narrower bands, and means for respectively energizing the other two of said electrodes in response to the detected components within said two narrower bands.

ROBERT B. DOME.

References Cited in the file of this patent

UNITED STATES PATENTS

| Number | Name | Date |
|---|---|---|
| 1,769,918 | Gray | July 8, 1930 |
| 1,769,920 | Gray | July 8, 1930 |
| 2,552,386 | Sziklai | May 8, 1951 |